E. LUDESCHER.
PULLING ATTACHMENT FOR MOTOR VEHICLES.
APPLICATION FILED MAR. 1, 1920.
1,401,263.
Patented Dec. 27, 1921.
2 SHEETS—SHEET 2.
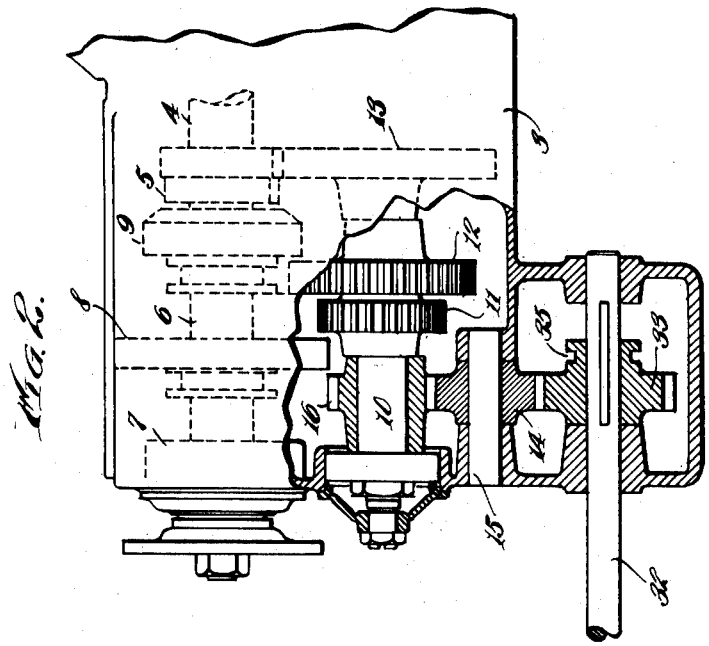
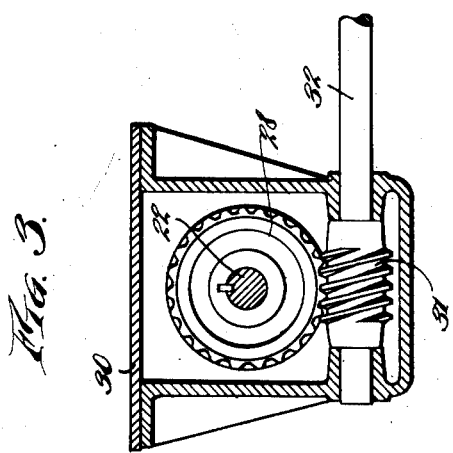
Inventor,
E. Ludescher.
By John A. Bommhardt
Atty.

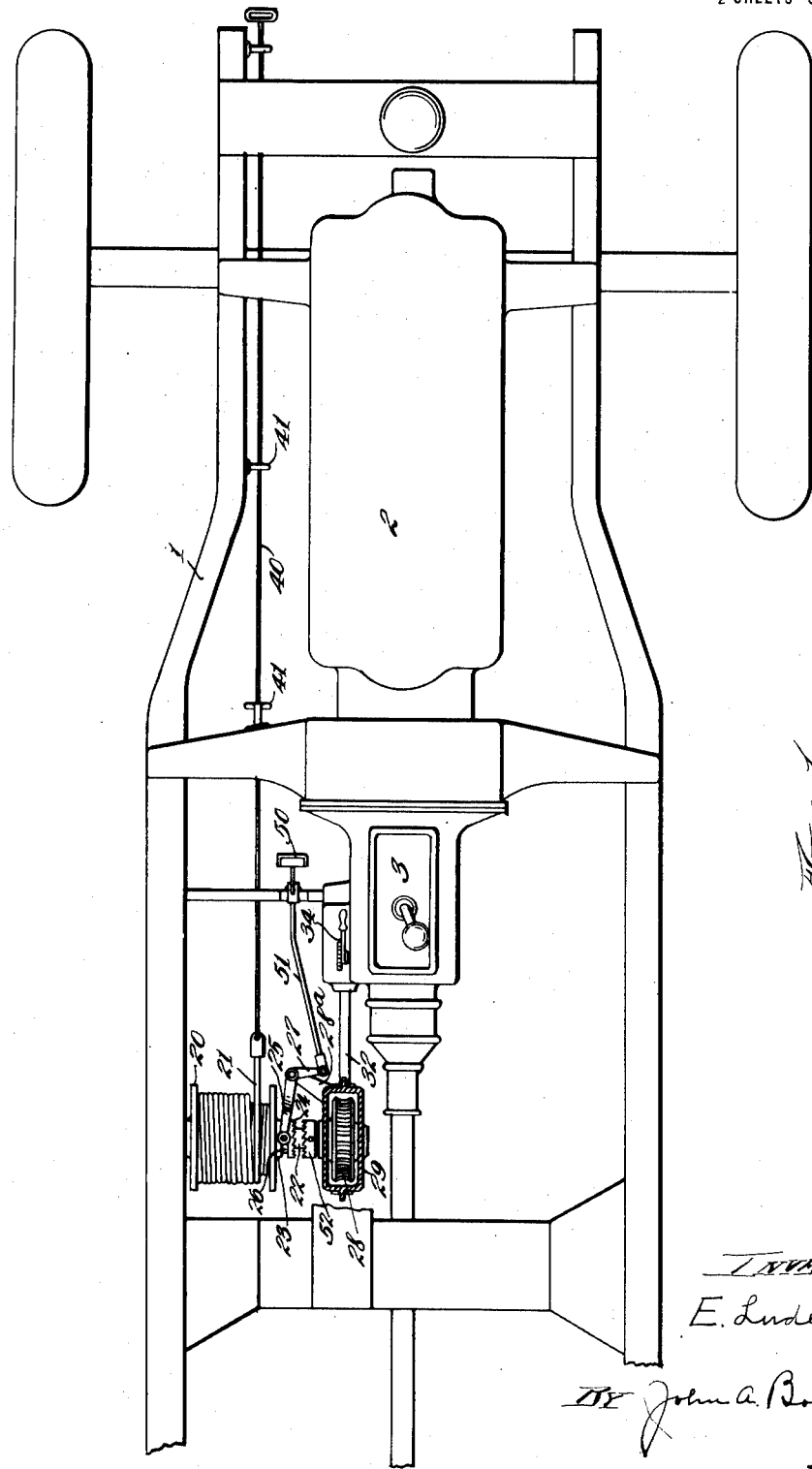

UNITED STATES PATENT OFFICE.

EDWARD LUDESCHER, OF CLEVELAND, OHIO.

PULLING ATTACHMENT FOR MOTOR-VEHICLES.

1,401,263. Specification of Letters Patent. Patented Dec. 27, 1921.

Application filed March 1, 1920. Serial No. 362,289.

*To all whom it may concern:*

Be it known that I, EDWARD LUDESCHER, a citizen of the United States, residing at Cleveland, in the county of Cuyahoga and State of Ohio, have invented certain new and useful Improvements in Pulling Attachments for Motor-Vehicles, of which the following is a specification.

This invention relates to a device to be applied to self propelled vehicles in such a manner as to permit of the engine, which is used to drive said vehicle, being used to retrieve the car or vehicle should it become lodged in mud holes, ditches or the like and has for its object to provide a machine of the character above specified which will be simple and compact in form, convenient and efficient in operation and very durable.

With these and other objects in view the invention consists of the certain arrangement of parts hereinafter illustrated and described in the accompanying drawings and specifically pointed out in the appended claims.

Referring to the drawings wherein like reference numerals designate similar parts of reference throughout the various views, Figure 1 is a diagrammatic plan of the forward end of a vehicle chassis with an embodiment of my invention applied thereto; Fig. 2 is an enlarged sectional elevation of the transmission showing the manner in which power is transmitted to the winding drum and Fig. 3 is a sectional detail through the worm wheel and its housing.

Referring particularly to Fig. 1 the apparatus consists of the ordinary chassis 1 upon which is mounted the engine 2 which has direct connection with the transmission indicated at 3. The said transmission is of the ordinary construction and includes the main crank shaft 4 upon which is mounted the high speed gear 5. A second shaft 6 provided at one end with a bearing 7 and piloted at the opposite end within the gear 5 has splined thereto an intermediate gear 8 and low speed gear 9. A jack shaft 10 suitably mounted in bearings within the transmission housing supports the intermediate and low speed driving gears 11 and 12 together with the main power gear 13. A spur gear 14 mounted upon a short way shaft 15 meshes with a similar gear 16 also upon the jack shaft 10. In the illustration this gear is slightly misplaced in order that it may be clearly shown and constitutes the reverse gear and it is by this gear that power is transmitted from the engine to the winding apparatus presently to be described.

The winding mechanism comprises a suitable drum 20 upon which the cable 21 is adapted to be wound. This drum is loosely mounted upon a shaft 22 and is provided with a hub 23 on the face of which are formed clutch teeth 24. The drum is adapted to be moved longitudinally of the shaft 22 by means of a shifting yoke 25 which has anti-friction rollers riding within an annular groove 26 formed in the hub 23 and said shifting yoke is formed upon one arm of a bell crank 27 pivotally mounted upon the extended arm 28ª of the worm housing 29, the opposite end of the bell crank is connected to a foot pedal 50 placed within convenient reach of the driver through the link 51. The shaft 22 has pinned thereto a collar 52 which has teeth formed upon one face thereof, thus when the drum is shifted the teeth engage each other and motion is transmitted thereto. The shaft 22 receives is motion from a worm wheel 28 secured within a housing 29 preferably supported by means of a gusset 30 secured to the chassis and said housing also contains a worm 31 which meshes with said worm wheel 28 and is mounted upon a shaft 32 which extends to the transmission housing and has bearing therein. Said shaft has splined thereto and within the transmission housing a spur pinion 33 which meshes with and is driven through the reverse gear 14 and said gear 33 is adapted to be moved into or out of engagement with the gear 14 by means of a forked lever 34, the forked end of which occupies the annular groove 35 in the hub of the gear 33.

In operation and when it is desired to pull the car from a mud hole or the like the end of the cable 21 is drawn to the front or rear of the car as the case may be by means of a fish wire 40 suitably supported in the eyes 41 carried by the chassis. The end of the cable is then secured to a fence post, tree trunk or similar stationary point, the vehicle transmission placed in the neutral position or that position which is shown in the drawings, and the gear shift lever 34 is then moved in a direction to cause the gear 33 to mesh with the gear 14. Motion is thereby transmitted to the shaft 22 and when everything is in readiness the clutch pedal 50 is operated to cause the drum 20 to move in a direction for the teeth 24 to engage the teeth of the collar 52. This causes the cable to be wound upon the drum and the car or vehicle to be pulled from its position.

Obviously the device is capable of various modifications and I do not wish to limit myself in the construction of the same further than is required by the state of the art or that which comes within the scope of the appended claims.

I claim:

1. The combination with a motor vehicle transmission, of a winding drum and its shaft, a way shaft carried by the transmission case and have a gear meshing with one of the transmission gears, and another shaft geared to the drum shaft and provided with a shifting gear thereon engageable with the gear on the way shaft.

2. The combination with a motor vehicle transmission having a jack shaft and a gear thereon, of a way shaft supported in the transmission case and provided with a gear meshing with the gear on the jack shaft, a third shaft one end of which is supported on the transmission case and provided with a shifting gear engageable with the gear on the way shaft, and a winding drum and its shaft geared to the other end of the third shaft.

3. The combination with a motor vehicle transmission, of a longitudinal shaft the front end of which is supported by the transmission case and the rear end of which is supported by the vehicle frame, a shiftable gear between the front end of said shaft and the transmission gear, a cross winding drum shaft supported by the said frame and geared to the rear end of the longitudinal shaft, a shifting lever for operating said shiftable gear, a drum on the drum shaft, and a clutch between the drum and its shaft, said clutch being provided with a separate lever to engage or disengage the same.

In testimony whereof, I do affix my signature in presence of two witnesses.

EDWARD LUDESCHER.

Witnesses:
JOHN A. BOMMHARDT,
ROBERT L. BRUCK.